United States Patent [19]

Nunley et al.

[11] Patent Number: 4,543,478

[45] Date of Patent: Sep. 24, 1985

[54] DETECTOR PULSE FORMING SYSTEM FOR NUCLEAR WELL LOGGING TOOLS

[75] Inventors: Allen Nunley; John G. Kampfer, both of Houston, Tex.

[73] Assignee: Halliburton Company, Duncan, Okla.

[21] Appl. No.: 448,089

[22] Filed: Dec. 9, 1982

[51] Int. Cl.⁴ .................. G01V 5/04; G01D 18/00
[52] U.S. Cl. ............................... 250/261; 250/252.1
[58] Field of Search ............... 250/261, 262, 252.1, 250/336.1; 328/115, 116; 307/264

[56] References Cited

U.S. PATENT DOCUMENTS

| | | | |
|---|---|---|---|
| 3,264,475 | 8/1966 | Reed et al. | 250/252.1 |
| 3,312,908 | 4/1967 | Porges et al. | 328/115 |
| 3,970,928 | 7/1976 | Kachel | 324/71.1 |
| 4,031,367 | 6/1977 | Murphy | 250/262 |

Primary Examiner—Alfred E. Smith
Assistant Examiner—Carolyn E. Fields
Attorney, Agent, or Firm—William J. Beard

[57] ABSTRACT

For use in a nuclear well logging tool, detector pulse simulator circuits in the preferred and illustrated embodiments are set forth. The simulator circuit is adapted to be placed in a sonde for connection with a well logging tool to provide simulated detector pulses. It is selectively switched on to the output a calibrated pulse sequence function through a number of different levels. It incorporates a circuit means forming pulses limited in amplitude by an envelope yielding pulses of differing amplitude in progression. The circuit is stepped repetitively through its range of operation, for example, from a minimum voltage peak to some specified maximum and then recycles.

4 Claims, 4 Drawing Figures

DETECTOR PULSE FORMING SYSTEM FOR NUCLEAR WELL LOGGING TOOLS

BACKGROUND OF THE DISCLOSURE

Periodically, a nuclear well logging circuit must be calibrated. Calibration involves testing with a standard. The output signal is observed and compared with an expected or anticipated output signal to determine whether or not the circuitry in the nuclear well logging apparatus is operating correctly.

Sometimes, such tools are suspected to malfunction in which instance it is necessary to do trouble shooting to locate a prospective difficulty. One difficulty in trouble shooting is the necessity of disassambly; tool assembly and disassembly before and after repair takes time. It is difficult to trouble shoot with a nuclear source because nuclear sources are, by nature, inexact, nonlinear or random in their output. By the very nature of the phenomena under investigation, the randomness poses a problem in knowing precisely what the source is doing so that the calibration can be carried out.

There is some difficulty in rigging a nuclear well logging tool for maintenance including both calibration or trouble shooting. The tool must be placed adjacent to some type of radiation source. Radiation sources for all types of tools would be necessary to service a tool in field circumstances. Some radiation sources cannot be readily shutdown, easily stored, or placed in a safe container. Rather, nuclear radiation sources used for calibration purposes must be treated as hazardous material and suitable precautions taken in light of this fact. Therefore, the present apparatus overcomes these handicaps to calibration or trouble shooting in that it furnishes a signal source for testing nuclear well logging tools without the impediment of safely hauling radiation sources. This apparatus furnishes a series of pulse of controlled pulse height distribution to enable calibration or trouble shooting of nuclear well logging tools.

The present apparatus can be used with a variety of nuclear logging tools. For instance, one type of nuclear logging tool is an apparatus which detects only pulses exceeding a certain height. Pulses below that height are discarded. Pulses above that height are counted. The circuit of this disclosure is an apparatus which provides pulses in a range of heights so that the trip point of the discriminator can be tested to thereby ascertain the level at which pulse detection occurs. This test circuit can be used with that type of instrument.

Another type of downhole nuclear logging tool utilizes multiple window analyzers. A number of pulses are received over a range of pulse heights. There might be two or more pulse height windows in the circuitry. This apparatus furnishes pulses to enable the pulse windows to be triggered selectively at different levels to ascertain the pulse height range to each window in the circuitry. Pulses within each window are thus summed or counted by this circuitry Another type of nuclear logging tool incorporates a spectroscopic detector. Inevitably, this involves conversion of an analog signal into a digital signal, typically being accomplished in an analog to digital converter. Through the use of the test instrument of this disclosure the linearity of the converter can be verified.

BRIEF SUMMARY OF THE DISCLOSURE

This circuitry is summarized as a calibration or test circuit usually incorporated in a nuclear well logging apparatus. That typically involves the placement of circuitry in a sonde to be suspended in a wellbore on a cable. This apparatus is adapted to be placed in the sonde with the well logging circuitry. Briefly, the circuitry of this disclosure forms a stepped level (the number can be specified), each step being sustained for a short interval during which interval a peak pulse is formed. The pulse is limited in amplitude to the stepped level. The circuit can be recycled through repetitive operations thereby cycling repetitively from some minimum voltage to some specified maximum voltage. The pulse train can be scaled by an attenuator to operate the measurement circuitry of the nuclear well logging tool through a desired operating range.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
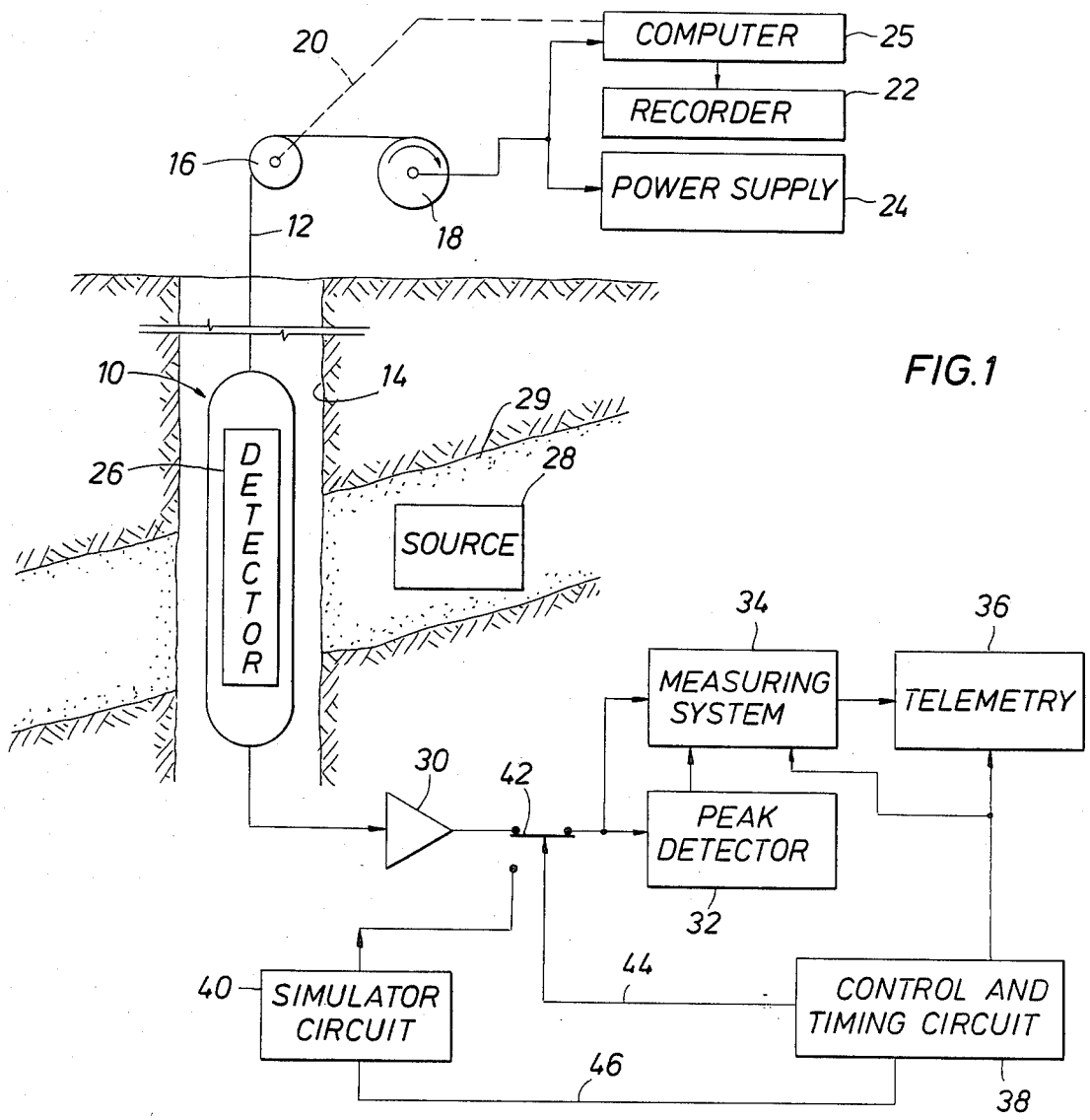
FIG. 1 is a block diagram schematic of a nuclear well logging circuit in a sonde which responds to a radiation source of some particular type and wherein a detector pulse simulator circuit is incorporated for testing, calibrations, and trouble shooting.

Attention is first directed to FIG. 1 of the drawings. In FIG. 1, a sonde 10 for supporting a nuclear well logging apparatus is shown. The sonde 10 is supported on a logging cable 12 and is adapted to be lowered into a borehole 14. It is raised and lowered on the cable 12. The cable passes over a pulley 16 and is spooled onto a large drum 18. The cable may be several thousand feet in length to enable logging of a very deep well 14.

As the cable is extended or retracted, the pulley 16 indicates the depth or location of the sonde 10 by means of depth determining apparatus indicated at 20 which is input to a data recorder 22 and connected computer 25. The recorder 22 is connected to the cable 12 to receive and record data. After the data has been formatted by the computer 25 the system also records the depth of the sonde in the wellbore 14 so that the recorded data can be correlated to formation depth in the well. The cable 12 also connects with a suitable power supply system 24 which furnishes power for operation of the sonde.

The sonde 10 encloses and supports nuclear well logging electronics. The numeral 26 identifies a nuclear detector. The precise nature and construction of the detector 26 can vary over a wide range and may include many types of equipment currently in use. The source 28 emits radiation which is modulated by the formation 29 and the radiation source may be naturally ocurring radiation in the formation 29 penetration by the wellbore 14. Alternatively, the radiation source may involve a radiation source carried in the sonde 10 which emits particles of differing energy levels from the sonde 10 into the adjacent formation 29 whereupon some type of return particles or radiation is received from the formation 29. Whatever the general definition, the source 28 is represented in symbolic form in FIG. 1. Moreover, the source 28 is a source which emits radiation through the formation 29 to the detector 26 which responds to the particles or emitted radiation, and the detector 26 forms output signals from the observed radiation. The output signals typically have the form of randomly distributed pulses of differing heights, the pulse amplitude being variable over a specified range typically from some maximum level.

The detector 26 is customarily output to an amplifier 30. The amplifier 30 is ordinarily connected to a peak detector 32. The peak detector is connected with a measuring system 34 which in turn forms an output supplied to a telemetry circuit 36. The telemetry circuit 36 provides a signal on the logging cable 12 which is transferred to the analysis and recording equipment at the surface. Operation of the downhole circuitry as described at this juncture is under supervision of a control and timing circuit 38.

The nuclear well logging circuitry shown in FIG. 1 is modified to include the simulator circuit of this disclosure. The detector pulse simulator circuit is identified generally at 40. It forms an output signal which is provided to an electronic switch 42. The location of the switch is at the output of the amplifier 30. When the nuclear well logging circuitry is being used in the intended fashion, the switch 42 is in the illustrated position of FIG. 1 to transfer the data to the peak detector and the measuring system. In other words, the nuclear logging apparatus is operated in the ordinary fashion for its intended purpose. At this point, the simulator circuit is disconnected and is not operative. However, the switch 42 can be operated, and if so, the detector 26 is switched out of the circuit. At this point, simulated pulses are supplied, and the detector is out of the circuit.

The simulator is thus switched in and out of the diagnostic mode depending on a control signal supplied to it from a conductor 44. When it finishes its operation, it forms a signal on the conductor 46 indicating that the operation has been completed.

Figure 2:
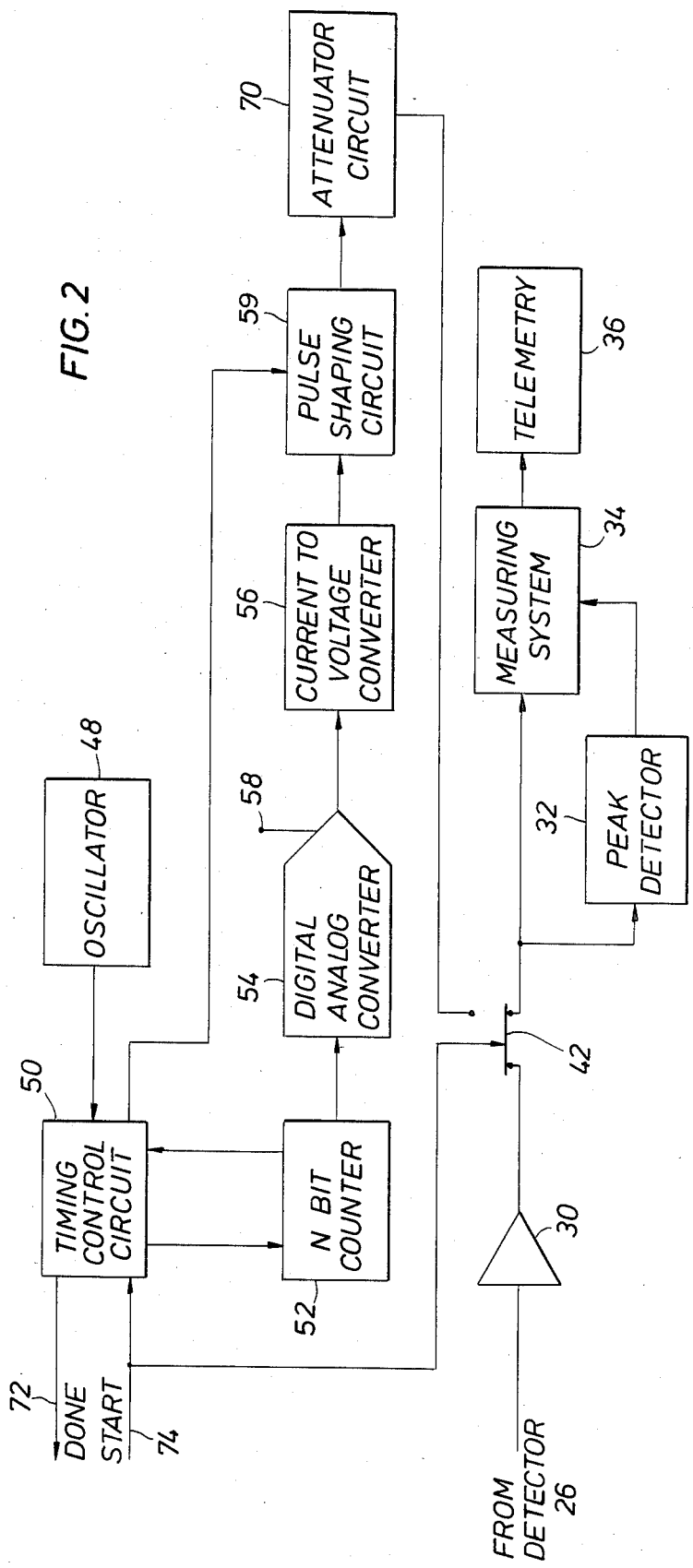
FIG. 2 is a block diagram schematic of the simulator circuit of the present disclosure showing its interconnection with the circuitry of the apparatus to undergo testing and calibration.

FIG. 2 shows the simulator circuitry in detail. The numeral 48 identifies an oscillator which forms a procession of pulses at a controlled frequency and amplitude. They are delivered to a timing control circuit 50 which feeds pulses to a multibit counter 52. Twelve bits is a suitable range although this can be varied. If the counter 52 has N equal to twelve, this provides incremented output levels (in digital coded form) ranging to 2048 levels. Since the first level is ground or reference level, this provides 2047 steps. The counter 52 is connected to a digital to analog converter 54. It forms output current levels supplied to a current to voltage converter 56. As desired, a test terminal is included at 58 on the digital to analog converter 54. The output from the converter 56 is a stepped level proceeding through 2048 steps (the first step being ground level). More or less steps than this could be used if desired. This is supplied to a pulse shaping circuit 59.

The pulse shaping circuit is provided with periodic timing pulses from the control circuit 50. These pulses are of a more or less uniform height. The pulses have suitable leading and trailing edge shapes to simulate detector pulses.

Figure 4:
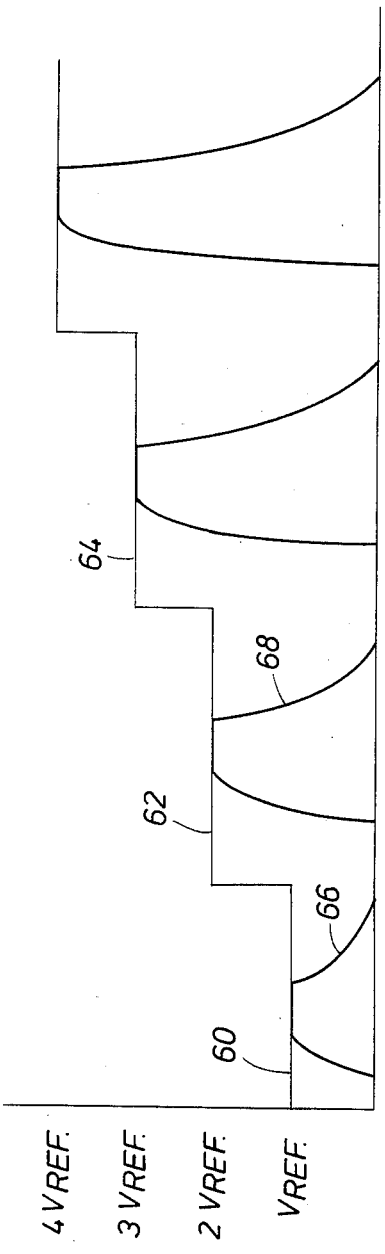
FIG. 4 is a graph representing a sequence of wave forms within the circuitry shown in FIGS. 2 and 3.

Assume that pulses are provided to the pulse shaping circuit 59 in sequence at a pulse repetition rate of one pulse every ten microseconds. The twelve bit counter is advanced so that it steps every ten microseconds also. This applies a different plateau input to the pulse shaping circuit at this rate, namely every ten microseconds also. As these pulses are input, they are scaled in amplitude. In other words, the output of the pulse shaping circuit 59 is limited to the step or level provided from the voltage input converter circuit 56. This can be more readily understood by reference to FIG. 4. FIG. 4 shows a first step 60. The step 60 is an established voltage reference divided by 2048. The step 60 is an established voltage reference divided by 2048. The step 62 is twice the amplitude as the 60. The step 64 is three times the amplitude. These three steps or levels are output by the converter 56. They are a duration which is established by the pulse repetition rate of the system, and in the example given above, that is one step every ten microseconds. The pulse shaping circuit 59 furnishes a pulse 66. The pulse 66 is held to the level 60 as a maximum value. In other words, the pulse 66 is formed during the step interval 60 and is limited to the amplitude as shown in FIG. 4. In like fashion, the pulse 68 occurs approximately ten microseconds later and its amplitude is also limited. The leading and trailing edges of the pulses 66 and 68 have specified slopes. The slopes are determined by the shape of the pulse which is input to the pulse shaping circuit 58.

Returning now to FIG. 2 of the drawings, an attenuator circuit 70 is provided with the output with the output of the pulse shaping circuit. It sizes the pulse procession to a specified size range. The attenuator can be omitted dependent on scale values of the pulses from the pulse shaping circuit 58.

FIG. 2 again illustrates the amplifier 30. It is connected to the electronic switch 42. The attenuator circuit 70 connects with the switch 42. The switch 42 selects actual or simulated signal for the peak detector 32 and the measuring system 34. The selected pulse source is connected to the telemetry output 36 as originally shown in FIG. 1.

The simulator circuit 40 can be switched into or out of the system. It will be observed that the simulator system includes an output conductor 72 with an input conductor 74. These are signal lines for triggering the simulator circuitry on or off.

Figure 3:
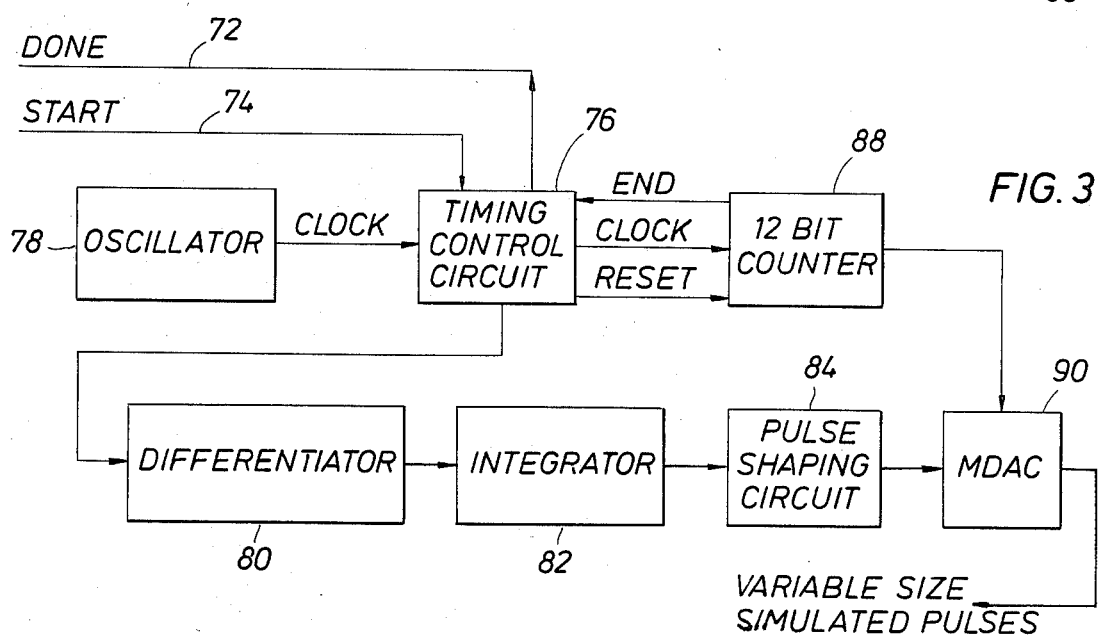
FIG. 3 is a block diagram schematic of an alternate embodiment of the simulator circuit of the present disclosure.

Attention is next directed to FIG. 3 of the drawings which illustrates an alternate embodiment. In FIG. 3, the conductors 72 and 74 are again illustrated. The embodiment of FIG. 3 includes a timing control circuit 76. An oscillator 78 forms a procession of pulses applied to the timing control circuit 76.

Pulses are fed from the timing control circuit 76 to a differentiator 80 which takes the derivative of the input signal, and on the leading edge thereof, forms a sharply rising positive pulse. On the trailing edge, it forms a negative going pulse. These pulses are input to an integrator 82. The integrator 82 forms an output pulse supplied to a pulse shaping circuit 84. This circuit functions primarily as a clamp circuit to assure an output of fairly uniform pulses at a controlled pulse repetition rate.

FIG. 3 additionally illustrates a twelve bit counter 88. It is able to encode 2048 combinations input to a multiplexed digital to analog convertor 90. The multiplier convertor 90 is provided with two inputs. One input is the stair stepped signal from the twelve bit counter as it cycles through 2048 steps or levels. Another input is the relatively uniform sized pulses from the pulse shaping circuit 48. The output is a procession of multiplied pulses. Each pulse is relatively similar in shape that increase with amplitudes. The amplitude runs up to the level required for each step. Incremental stepping is thus accomplished in the multiplier convertor 90. This enables the equipment to form output pulses similar to those shown in FIG. 4. Moreover, they are output at a controlled rate and amplitude.

As will be observed, the system forms a series of pulses ranging from zero amplitude through a number of steps up to an arbitrary maximum. The maximum value is scaled. The number of steps is 2048 in this embodiment, and this provides 2047 levels above ground. Scale values can be changed. For instance, the maximum size pulse can be changed by altering the attenuation of the system. The pulse rate can be changed; a pulse repetition rate of ten microseconds per pulse was suggested. This again can be changed. The slope of the pulses can be changed, thereby yielding differently shaped leading and trailing edges. Pulse shape characteristics are often as important as pulse height or amplitude.

One advantage of this equipment is that the pulses increment up to some maximum value. The simulator 40 can be operated in the opposite fashion, namely decrementing from a maximum to a minimum value. In either case, the nuclear well logging circuitry is rigorously tested so that the operation, linearity, and trip levels of the connected circuitry can be tested and analyzed. Moreover, through suitable conductors ties at selected test points in the logging tool to be tested, the various wave forms can be monitored so that trouble shooting is made easy. The simulator 40 of this disclosure is normally switched out of operation. Yet, it is available for quick testing because it is packaged with the nuclear well logging circuitry. The modular circuit is normally placed in the sonde and travels with the circuitry in the sonde. This enable the simulator 40 to be used quickly and readily without requiring interruptions or tedious testing procedures utilizing radioactive sources or the like.

Consider as an easy example the test circuit 40 of the present invention installed in the sonde. Should data of a questionable character be obtained during a logging run, the run can be quickly and easily interrupted while suspending the sonde 10 in the well at a specified depth and thereafter switching on the test circuitry. After it is switched on, several cycles of operation from minimum to maximum value can be run and quick analytical data can be obtained at the surface to determine whether or not the circuitry in the nuclear well logging apparatus is operating in the correct fashion. Calibration can also be accomplished under these circumstances. The formatted test signal formed by this circuitry can be applied to the pulse height measuring equipment in the nuclear well logging circuitry to determine if it is operating in the correct manner.

The circuitry of this disclosure is advantageous when the equipment is out of the borehole. For instance, field testing and calibration just before a test run might be very desirable. Testing can be easily accomplished while the sonde 10 is at the surface. Through the application of a signal which operates the electronic switch 42, the test circuitry is switched on. Testing is accomplished without difficulties in handling a standard calibrated radiation source. Testing does not require the typical precautions which must be carried out to use radioactive sources. The simulation is applied to the nuclear well logging circuitry to test before the logging run to assure that the circuitry is in good working order. Indeed, it might be helpful to record data at the recorder 22 from the nuclear well logging circuitry during calibration. A calibration at the start of the run, when the tool is at the bottom of the borehole, and at the end of a run, are optionally recorded. If calibration data is recorded, it is easy to verify that the nuclear well logging circuitry did operate correctly. Should that data reflect something other than the desired result, then service and maintenance can be implemented before a logging run has been taken, or alternatively, if there is a verified percentage drift in performance obtained from calibration, then the recorded data could be adjusted to account for the variation. In any case, the implementation of calibration procedures before, during and after a logging run yields validation of the data taken during the logging run.

While the foregoing is directed to the preferred embodiment, the scope is determined by the claims which follow.

What is claimed is:

1. A pulse simulator for generating output pulses of controlled amplitude and frequency for use in a downhole nuclear well logging instrument for calibrating a pulse height analyzer for measuring the energy of radiation from materials in the vicinity of a well borehole, comprising:
    means for generating a plurality of voltage pulses of approximately constant amplitude at a repetition rate controlled by a clock oscillator;
    digital means responsive to said clock oscillator for generating a digital control signal for determining the amplitude of said output pulses of said simulator; and
    means responsive to said approximately constant amplitude pulses and said digital control signal for generating therefrom a plurality of analog voltage pulses having monotonically increasing or decreasing amplitudes as a function of time.

2. The pulse simulator of claim 1 and further including means responsive to said approximately constant amplitude pulses for shaping the leading and trailing edges of said pulses prior to inputting said pulses to said means responsive to said pulses and said digital control signal.

3. The pulse simulator of claim 2 and further including means for switching the output therefrom in said downhole instrument to the input of a pulse height analyzer in response to a control signal.

4. The pulse simulator of claim 3 and further including attenuation means responsive to the output thereof for varying the overall scale thereof prior to input to a pulse height analyzer.

* * * * *